US011700268B2

(12) United States Patent
Zaw

(10) Patent No.: US 11,700,268 B2
(45) Date of Patent: Jul. 11, 2023

(54) SYSTEMS AND METHODS FOR PROVIDING SHIFTING NETWORK SECURITY VIA MULTI-ACCESS EDGE COMPUTING

(71) Applicant: VERIZON PATENT AND LICENSING INC., Basking Ridge, NJ (US)

(72) Inventor: Tin Zaw, Santa Monica, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 141 days.

(21) Appl. No.: 17/337,774

(22) Filed: Jun. 3, 2021

(65) Prior Publication Data
US 2021/0297434 A1    Sep. 23, 2021

Related U.S. Application Data

(63) Continuation of application No. 16/284,944, filed on Feb. 25, 2019, now Pat. No. 11,038,902.

(51) Int. Cl.
*H04L 9/40* (2022.01)

(52) U.S. Cl.
CPC ...... *H04L 63/1416* (2013.01); *H04L 63/0209* (2013.01); *H04L 63/0245* (2013.01); *H04L 63/1441* (2013.01)

(58) Field of Classification Search
CPC ............ H04L 63/1416; H04L 63/0209; H04L 63/0245; H04L 63/1441; H04L 63/1458; H04W 12/122
See application file for complete search history.

(56) References Cited

U.S. PATENT DOCUMENTS

| | | | |
|---|---|---|---|
| 10,021,131 B2 | 7/2018 | Daniel et al. | |
| 10,038,715 B1 | 7/2018 | Majkowski et al. | |
| 2002/0035698 A1* | 3/2002 | Malan ................. | H04L 43/00 726/23 |
| 2002/0166063 A1* | 11/2002 | Lachman, III ...... | H04L 63/1458 713/188 |
| 2004/0128550 A1 | 7/2004 | Govindarajan et al. | |
| 2009/0013404 A1 | 1/2009 | Chow et al. | |
| 2010/0020796 A1* | 1/2010 | Park ................... | H04L 63/1466 370/390 |
| 2013/0269031 A1 | 10/2013 | Nakao et al. | |
| 2015/0350231 A1 | 12/2015 | Dubrovsky et al. | |
| 2017/0070531 A1* | 3/2017 | Huston, III ........ | H04L 63/0428 |
| 2017/0214702 A1 | 7/2017 | Moscovici et al. | |

(Continued)

*Primary Examiner* — Meng Li

(57) ABSTRACT

Disclosed is a device for configuring and implementing network security for a connected network node, and for shifting the network security closer to the attack point of origin. In particular, the device may activate attack protections on different Multi-Access Edge Computing ("MEC") devices that are physically located near or at the attack point of origin. The device may detect an attack signature based on one or more received data packets, and may provide a response with an extended header field, the attack signature, and/or other attack protection instructions. The responses may be passed to an address of a suspected attacker. MEC devices along the network path may detect and receive the responses, and implement attack protections in response. The responses may also be passed to a multicast or broadcast address that the MEC device may use to receive responses.

20 Claims, 9 Drawing Sheets

(56) References Cited

U.S. PATENT DOCUMENTS

| | | | |
|---|---|---|---|
| 2017/0223052 A1* | 8/2017 | Stutz | H04L 63/1491 |
| 2017/0237768 A1* | 8/2017 | Daniel | H04L 63/1458 |
| | | | 726/23 |
| 2018/0199303 A1* | 7/2018 | Vayilapelli | H04W 8/265 |

* cited by examiner

SYSTEMS AND METHODS FOR PROVIDING SHIFTING NETWORK SECURITY VIA MULTI-ACCESS EDGE COMPUTING

CLAIM OF BENEFIT TO RELATED APPLICATIONS

This application is a continuation of U.S. nonprovisional application Ser. No. 16/284,944 entitled "SYSTEMS AND METHODS FOR PROVIDING SHIFTING NETWORK SECURITY VIA MULTI-ACCESS EDGE COMPUTING", filed on Feb. 25, 2019. The contents of application Ser. No. 16/284,944 are hereby incorporated by reference.

BACKGROUND

A firewall or other network security device may be located at a gateway to a network node. The network node may be the target of a network attack. The network security device may inspect traffic that is intended for the targeted node, and may protect the targeted node from attack traffic (by blocking, redirecting, or otherwise preventing the attack traffic from overwhelming the targeted node).

Although the network security device may be effective at protecting the targeted node, the attack traffic still propagates through the network to the point of attack. The attack traffic (e.g., a distributed denial of service attack) may originate from a distributed network of bots, and may create congestion at different parts of the network in an attempt to overwhelm the security protections at the point of attack. Accordingly, the flood of attack traffic may adversely affect other nodes and/or end users by limiting their ability to access the network.

Some attacks are more sophisticated and may be more difficult for the network security device to detect. For instance, attackers may spoof their addressing so that the attack traffic appears to be coming from a diverse set of User Equipment ("UEs"). The network security device may determine that the traffic from any single spoofed UE is not enough to trigger the attack protections. Accordingly, the network security device may allow the attack traffic through to the targeted node. In this case, the targeted node may be unprotected from the attack traffic, and may be unable to respond to valid traffic because of the load imposed by the spoofed attack traffic.

DETAILED DESCRIPTION OF PREFERRED EMBODIMENTS

The following detailed description refers to the accompanying drawings. The same reference numbers in different drawings may identify the same or similar elements.

Multi-access Edge Computing ("MEC") is a network architecture that provides configurable resources throughout a network. In particular, MEC devices may be located at or close to the network points of access (e.g., network edges) where different User Equipment ("UEs") gain access to the network. Each MEC device may provide configurable storage, processing, networking, and/or other resources. The resources of the MEC devices may be configured to provide cached content, services, computing, and/or data from network locations that are closer to the network points of access and the UEs so that UEs can receive the content, services, computing, and/or other data with less latency.

Systems and/or methods, as described herein, leverage the configurable resources of the MEC devices to provide network security from or near the network points of access where attack traffic originates. In particular, the systems and/or methods provide network security that originates at a targeted node within the network core, and that shifts to the MEC devices operating at or near the network points of access. Some embodiments provide a MEC security controller that detects different network attacks targeting one or more network nodes, selects one or more MEC devices in the network paths between the targeted network nodes and the network points of access where the network attack traffic originates, implements custom attack protections based on the network attack traffic, and/or shifts the custom attack protections to the selected one or more MEC resources for enforcement closer to where the attack traffic enters the network.

The MEC controller may provide the shifting network security for different attack traffic of different network attacks. For instance, the shifting network security may disrupt, combat, and/or protect against denial of service, flood, intrusion, phishing, worm, brute force, malware, cross-site scripting, Standardized Query Language ("SQL") injection, man-in-the-middle, and/or other network attacks.

Figure 1:
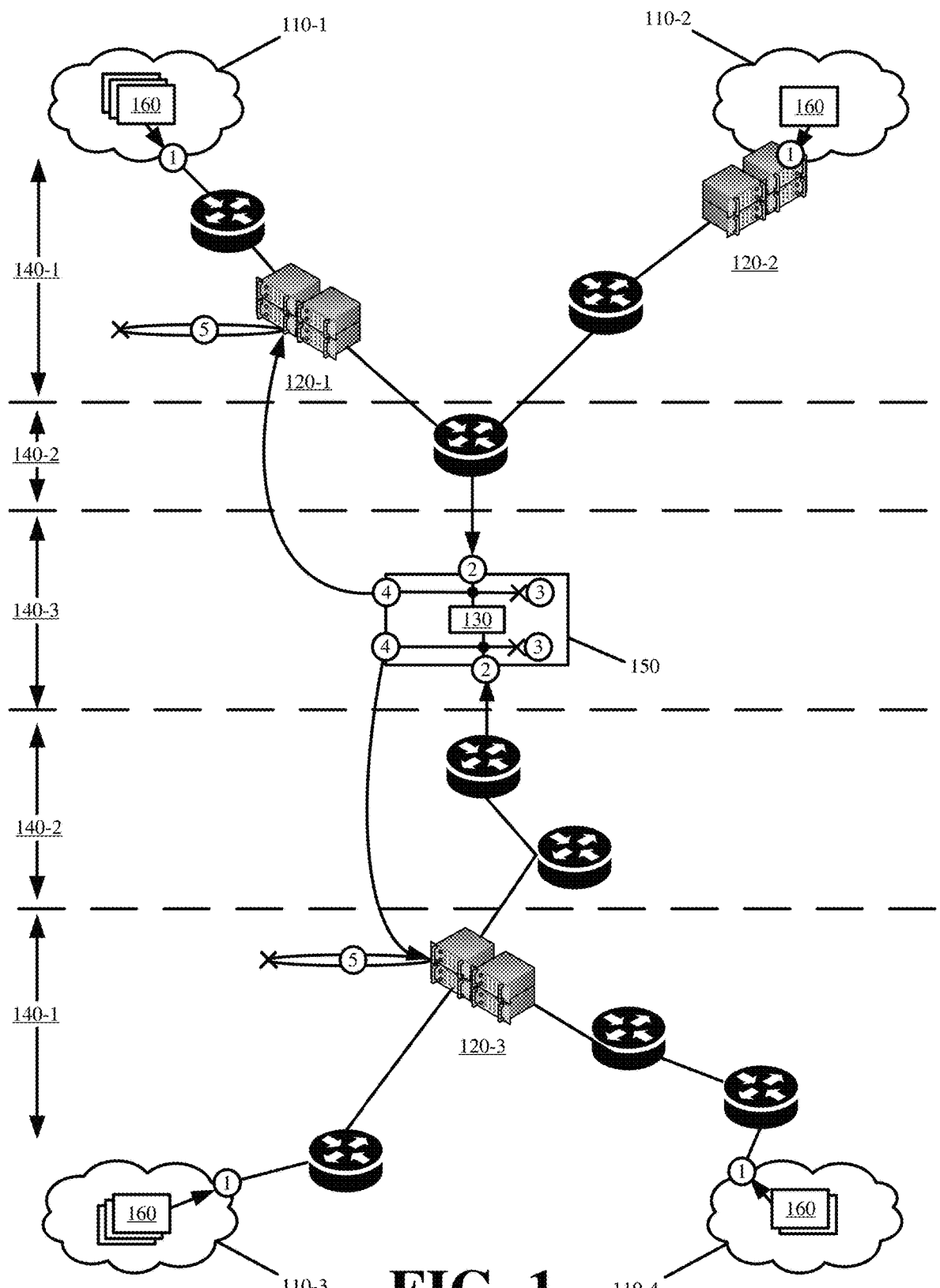
FIG. 1 conceptually illustrates a Multi-Access Edge Computing ("MEC") security controller providing the shifting network security using MEC devices in accordance with some embodiments described herein.

FIG. 1 conceptually illustrates the MEC security controller providing the shifting network security using MEC devices in accordance with some embodiments described herein. FIG. 1 illustrates different network points of access 110-1, 110-2, 110-3, and 110-4 (herein sometimes collectively referred to as "network points of access 110" or individually as "network point of access 110"), MEC devices 120-1, 120-2, and 120-3 (herein sometimes collectively referred to as "MEC devices 120" or individually as "MEC device 120"), targeted network node 130, network tiers 140-1, 140-2, and 140-3 (herein sometimes collectively referred to as "network tiers 140" or individually as "network tier 140"), MEC security controller 150, and User Equipment ("UEs") 160.

As shown in FIG. 1, MEC security controller 150 may operate in conjunction with or at a gateway to network node 130 in network tier 140-3. MEC devices 120 are located closer to network points of access 110 based on a physical presence in network tier 140-1. Network tier 140-2 may include other nodes, devices, and/or network equipment in network paths between network points of access 110 and node 130. For instance, network tier 140-2 may include servers of a content delivery network ("CDN") that redistribute content for nodes that are located farther away from network points of access 110 in network tier 140-3, and that can therefore accelerate the delivery of the redistributed content relative to nodes in network tier 140-3. Stated differently, network tier 140-1 may include nodes, devices, and/or network equipment that are some first number of hops or some first amount of latency from one or more network points of access 110, network tier 140-2 may include nodes, devices, and/or network equipment that are some greater second number of hops or some greater second amount of latency from one or more network points of access 110, and network tier 140-3 may include nodes, devices, and/or network equipment that are some third number of hops or some third amount of latency from one or more network points of access 110. The number of network hops and/or latency from network points of access 110 increases from first network tier 140-1 to second network tier 140-2, and form second network tier 140-2 to third network tier 140-3.

UEs 160, operating from different network points of access 110, may transmit (at 1) data packets to node 130. For instance, the data packets may be addressed to a network address of node 130, or may include a Uniform Resource Locator ("URL") that is directed to content, services, processing, and/or data hosted or originated by node 130. MEC security controller 150 may inspect (at 2) the data packets to determine if the data packets from any UEs 160 are part of a network attack against node 130.

In response to detecting an attack that targets node 130, MEC security controller 150 may provide (at 3) attack protections for node 130. The attack protections may include blocking attack data packets, redirecting attack data packets, submitting a CAPTCHA or other problem to the sending UEs 160 to prove they are not an attacking bot, and/or other actions that prevent the attack data packets from affecting node 130. In other words, MEC security controller 150 may operate as a firewall to provide a line of defense against the attack data packets targeting node 130.

Additionally, or alternatively, MEC security controller 150 may determine that the attack data packets originate from UEs 160 at network points of access 110-1 and 110-3, and may establish a distributed set of attack protections by activating (at 4) attack protections on MEC devices 120-1 and 120-3 located in the network paths to network points of access 110-1 and 110-3. In response to activating (at 4) the attack protections, MEC devices 120-1 and 120-3 may block (at 5) or otherwise prevent the attack data packets issued by UEs 160 at network points of access 110-1 and 110-3 from entering further into the network.

By establishing the distributed set of attack protections, MEC security controller 150 divides the collective network attack into a smaller set of attacks that are combatted in a distributed manner with MEC devices 120-1 and 120-3, rather than in a centralized manner where all the attack traffic is concentrated at the point of attack (e.g., node 130). Accordingly, MEC security controller 150, node 130, and/or other devices accessed via the same gateway as node 130 no longer receive the full load of the network attack, which in some cases could degrade performance of node 130 or make node 130 unavailable when the network attack is of sufficient size such that a majority of resources are diverted to detecting and blocking the attack data packets, and little or no resources are left to respond to valid data packets.

The same benefit extends to other nodes, devices, or network equipment that are accessed via some of the same network hops or links as node 130. By implementing attack protections in network tier 140-1 with MEC devices 120-1 and 120-3 that are closer to network points of access 110-1 and 110-3, nodes, devices, or network equipment in network tiers 140-2 and 140-3 are no longer flooded with attack data packets. Moreover, network equipment in network tiers 140-2 and 140-3 no longer waste resources in routing the attack data packets to node 130, thereby freeing bandwidth and/or other resources for valid traffic distribution.

Figure 2:
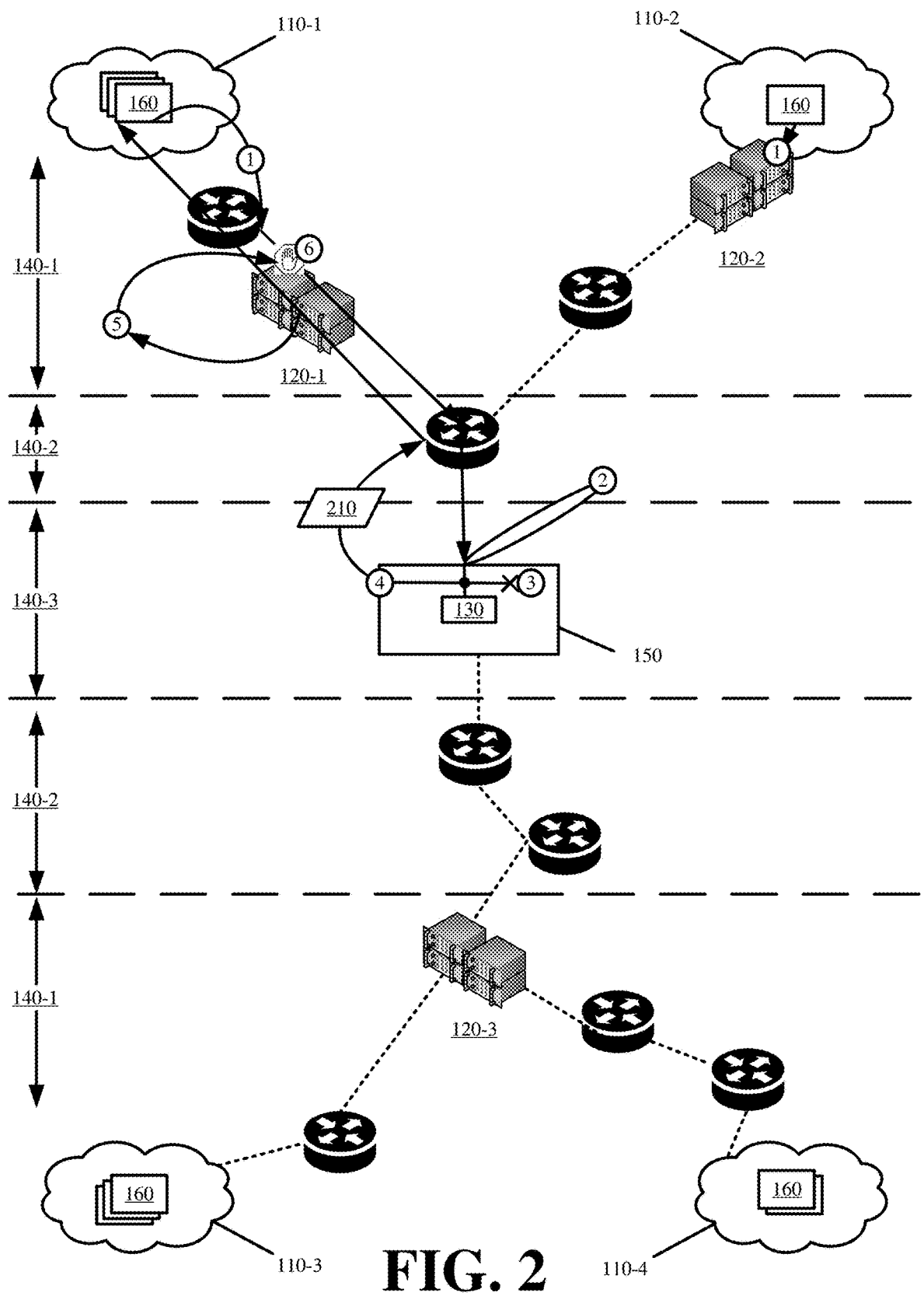
FIG. 2 illustrates an example that demonstrates the MEC security controller shifting network security through the network in accordance with some embodiments described herein.

FIG. 2 illustrates an example that demonstrates MEC security controller 150 shifting network security through the network in accordance with some embodiments described herein. In FIG. 2, one or more UEs 160 send (1) attack data packets from network point of access 110-1 to node 130.

MEC security controller 150 may detect (at 2) the network attack by analyzing the attack data packets, and by detecting one or more attack signatures in the attack data packets. MEC security controller 150 may activate (at 3) attack protections to prevent or reduce the amount of attack traffic that reaches node 130. MEC security controller 150 may also shift the attack protections closer to the attack point of origin where the attack traffic originates.

MEC security controller 150 may shift the attack protections by responding (at 4) to the attack data packets with security activation messages 210. Security activation messages 210 may be addressed and sent to UEs 160 that originate the attack data packets. Accordingly, security activation messages 210 may traverse the same network hops as the attack data packets in order to reach UEs 160 in network point of origin 110-1 where the attack data packets originated.

MEC device 120-1 may be located along the traversed network path, and may inspect traffic passing along the network path for security activation messages 210. In response to detecting (at 5) security activation messages 210 from MEC security controller 150, MEC device 120-1 may implement (at 6) attack protections against the perpetrating UEs 160. By addressing and sending security activation messages 210 to UEs 160 that originate the attack data packets, MEC security controller 150 can configure attack protections on MEC devices 120 that are located along the network path to the perpetrating UEs 160 without directly addressing security activation messages 210 to the MEC devices 120. As a result, MEC security controller 150 need not maintain location and/or addressing of each MEC device 120 in the network, but can still activate attack protections on MEC devices 120 in a targeted manner. In some other embodiments, MEC security controller 150 may retain a location and addressing of each MEC device 120 in order to direct specialized messaging to specific MEC devices 120.

In some embodiments, MEC security controller 150 may be a distributed device with different instances operating to protect different nodes (e.g., node 130) from attack. The nodes along with the different instances of MEC security controller 150 may be distributed throughout a network. The collective set of MEC security controllers 150 may collaborate to detect different network attacks, and/or initiate attack protections on MEC devices 120 that may protect and benefit the collective set of nodes. For instance, the different instances of MEC security controller 150 may communicate with one another in order to detect a network attack that may be launched against or distributed across different targeted nodes, and/or may activate protections for a particular network attack on other instances of MEC security controller 150 without those other instances detecting that particular network attack.

Figure 3:
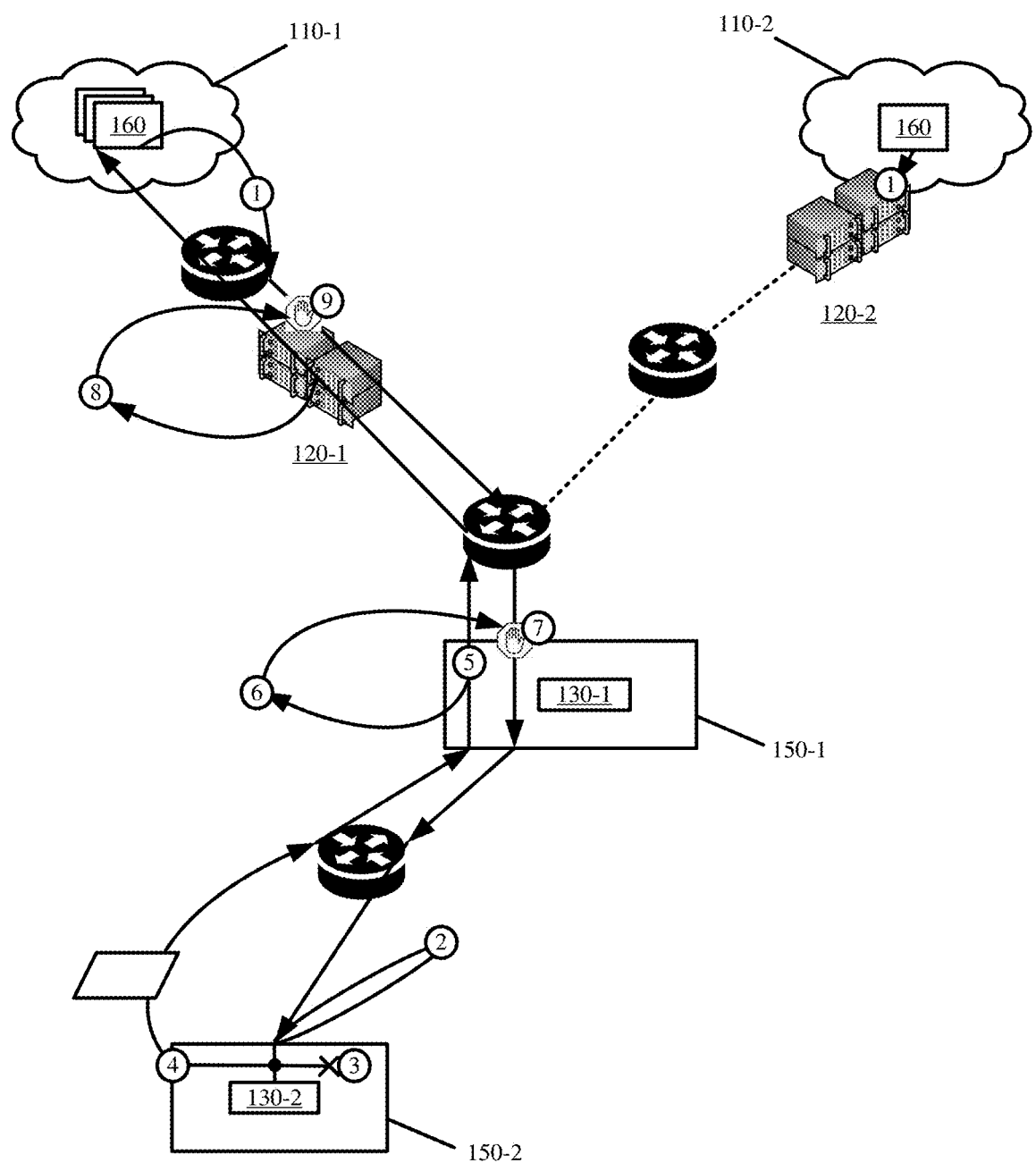
FIG. 3 illustrates an example of shifting attack protections closer to the attack point of origin using different instances of the MEC security controller and MEC devices in accordance with some embodiments described herein.

FIG. 3 illustrates an example of shifting attack protections closer to the attack point of origin using different instances of MEC security controller 150 and MEC devices 120 in accordance with some embodiments described herein. FIG. 3 includes UEs 160, network point of access 110-1 from which UEs 160 operate, MEC device 120-1, first node 130-1 with first MEC security controller 150-1, and second node 130-2 with second MEC security controller 150-2. MEC device 120-1, first node 130-1, and first MEC security controller 150-1 may be located in the network path connecting second node 130-2 to UEs 160 operating from network point of access 110.

UEs 160 may send (at 1) attack data packets that target node 130-2. The attack data packets may route thorough MEC device 120-1, first MEC security controller 150-1, and/or other network equipment until arriving at second MEC security controller 150-2.

Second MEC security controller 150-2 may inspect the attack data packets, and may determine (at 2) that the attack data packets are part of a network attack. Accordingly, second MEC security controller 150-2 may implement (at 3) attack protections to prevent the attack data packets from impacting node 130-2. Second MEC security controller 150-2 may also issue (at 4) a security activation message in response to each attack data packet.

Each security activation message may be addressed to a perpetrating UE 160 in network point of access 110-1, and may therefore traverse the same or similar set of network hops as the attack data packets in order to arrive at network point of access 110-1. First MEC security controller 150-1 may inspect (at 5) the messaging flowing over the network path, and may detect (at 6) the security activation messages issued by second MEC security controller 150-2. In response to the security activation messages, first MEC security controller 150-1 may activate (at 7) one or more attack protections for protecting against the attack data packets sent by UEs 160 in network point of access 110-1. In particular, first MEC security controller 150-1 may act as a firewall that blocks data packets having an attack signature similar to those sent by UEs 160 to second node 130-2. First MEC security controller 150-1 may block the attack data packets that are intended for any node (e.g., node 130-1 or node 130-2) in the network and that pass through first MEC security controller 150-1, or may activate the security protections for data packets that have the same attack signature and that target node 130-1.

The security activation messages may continue upstream towards network point of access 110-1 where they are also detected (at 8) by MEC device 120-1. In response to the security activation messages, MEC device 120-1 may activate (at 9) the same or similar attack protections. For instance, MEC device 120-1 may block the attack data packets that are intended for any node (e.g., node 130-1 or node 130-2) in the network and that pass through MEC device 120-1, or may activate the security protections for data packets that have the same attack signature and that target node 130-2 specifically.

In some embodiments, the security activation messages can instruct MEC devices 120 and/or other MEC security controllers 150 to implement attack protections against specific UEs 160, specific traffic, and/or combinations thereof. For instance, a security activation message may include a header or payload with one or more identifiers for UEs 160 and/or traffic to block.

The identifiers may include the Internet Protocol ("IP") address of a perpetrating UE 160, an attacked port number, user agent, an attacked domain name, an attacked URL, attack signature used by a perpetrating UE 160, and/or other values that can differentiate attacking UEs 160 and/or attacking traffic from valid UEs and/or valid traffic. An attack signature may specify a Transmission Control Protocol ("TCP") sequence number, window size, and/or other header parameters that are repeated or that follow a pattern. The repeated values or pattern may be provided as part of the security activation messages. The attack signature could be any repeated set of values in the attack packet headers and/or payload, or any repeating pattern. The attack signature could also include randomized parameters that deviate from expected values.

In some embodiments, the security activation messaging may be specified in error messaging that is returned in response to a detected attack data packet. For instance, MEC security controller 150 may use HyperText Transfer Protocol ("HTTP") 3$xx$ (redirection), 4$xx$ (client error), and/or 5$xx$ (server error) status code messages as the security activation messaging. Other network messaging may be also be adapted for the purpose of activating attack protections.

In some embodiments, MEC security controller 150 may adapt existing headers and/or may introduce extended header fields into the security activation messages to identify attack protections to implement against specific UEs 160 and/or targeted traffic, specific attack protections from an available set of attack protections to implement, duration to enforce the attack protections, and/or other instructions for configuring and/or controlling the attack protections implemented by MEC devices 120. For instance, different attack protections that may be available include dropping, block, or redirecting attack packets. Other attack protections may include blacklisting specific UE addressing and/or identifiers. Still other attack protections may include submitting a computational problem to the suspected attacking UE, and awaiting a correct solution to the problem from the UE before allowing packets from the suspected attacking UE to reach an intended destination.

In some embodiments, MEC security controller 150 may insert an X-MECSecurity parameter into the header of the security activation messages. MEC security controller 150 may populate the X-MECSecurity header parameter with the instructions for UEs 160 and/or traffic to block. MEC devices 120 may detect and reconfigure attack protections in response to the X-MECSecurity header parameter.

To prevent improper configuration of MEC devices 120 and/or MEC security controllers 150 by others, a particular MEC security controller 150 may insert a unique digital signature within the security activation message. The particular MEC security controller 150 may use a private encryption key to generate different signatures at different times to prevent tampering and/or spoofing by others.

In response to receiving a security activation message, MEC devices 120 and/or other MEC security controllers 150 may use a corresponding public key to decrypt the signature, and determine that a security activation message for implementing attack protections originated from a recognized MEC security controller 150 and was not tampered with during transmission. If a security activation message includes an improper signature or omits the signature entirely, the receiving device may ignore the message.

Figure 4:
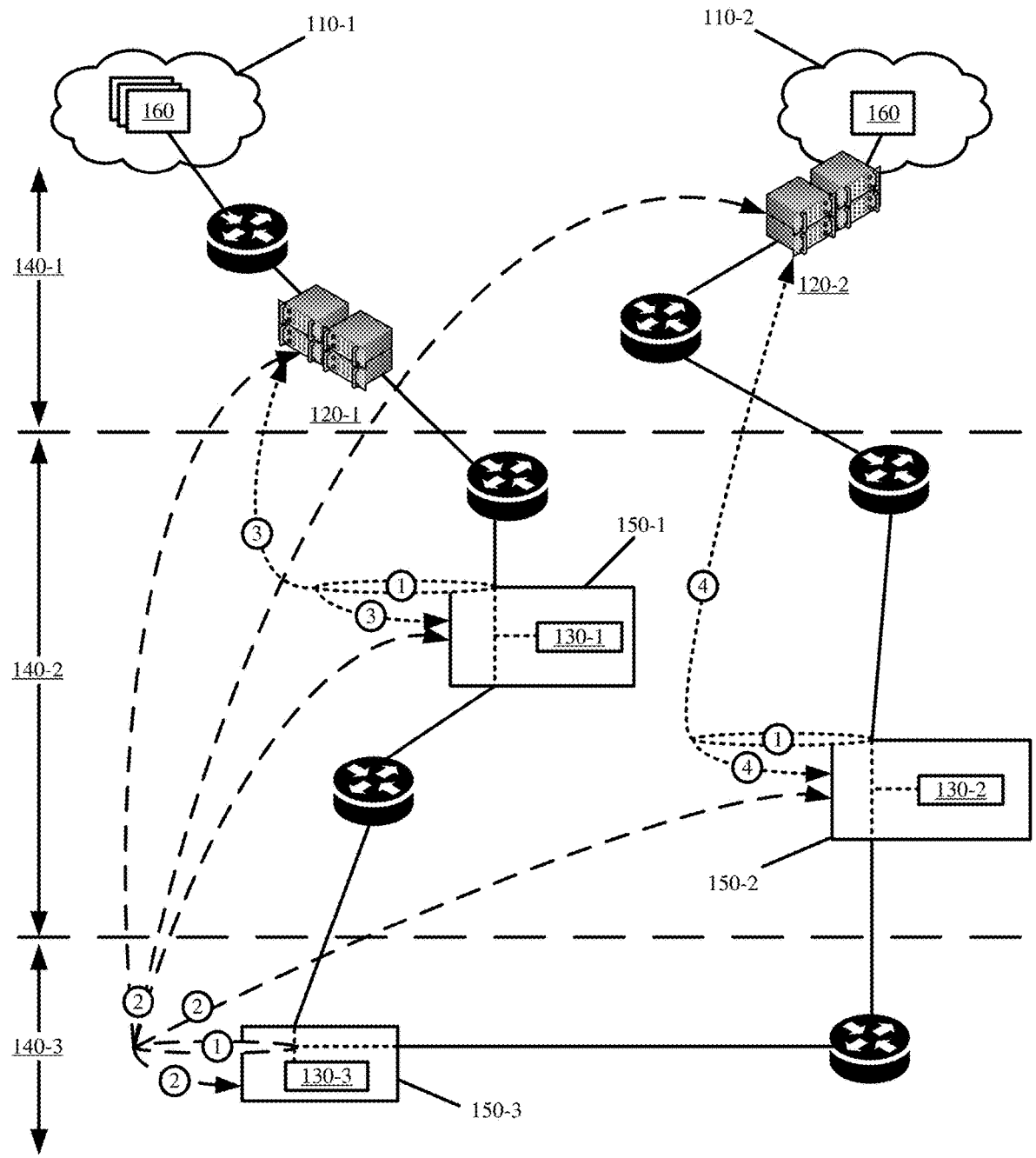
FIG. 4 illustrates an example of a distributed MEC security controller operating at different network nodes in different network tiers in accordance with some embodiment described herein.

In some embodiments, MEC security controller 150 may leverage different amounts of compute power available at different points in a network in order to provide faster attack response and/or detect different network attacks from different points in the network. FIG. 4 illustrates an example of a distributed MEC security controller 150 operating at different network nodes in different network tiers in accordance with some embodiment described herein.

As shown in FIG. 4, a first instance of MEC security controller 150-1 may operate in conjunction with node 130-1 in network tier 140-2, a second instance of MEC security controller 150-2 may operate in conjunction with node 130-2 in network tier 140-2, and a third instance of MEC security controller 150-3 may operate in conjunction with node 130-3 in network tier 140-3. Nodes 130-1 and 130-2 in second network tier 140-2 may correspond to servers at different Points-of-Presence ("PoPs") of a CDN or other distributed platform, and node 130-3 in third network tier 140-3 may correspond to one or more servers of a data center and/or origin site.

In FIG. 4, nodes 130-1 and 130-2 may cache and distribute content, services, processing, and/or data on behalf of node 130-3. For instance, node 130-3 may be a content provider origin site, and nodes 130-1 and 130-2 may retrieve content from the content provider origin site (e.g., node 130-3) in order to store cached copies of that content closer to network points of access 110-1 and 110-2 so that the content can be served more efficiently (e.g., with less latency) than from node 130-3.

MEC security controllers 150-1 and 150-2 may be configured to detect a first set of network attacks, and MEC security controller 150-3 may be configured to detect a different second set of attacks. The different sets of attacks detected by MEC security controllers 150 in different tiers 140 may be based on the attack data packets that each MEC security controller 150 receives.

For instance, MEC security controller 150-1 may receive attack data packets that originate from UEs 160 operating in network point of access 110-1, while MEC security controller 150-2 may receive attack data packets that originate from UEs 160 operating in network point of access 110-2. MEC security controller 150-3 may receive all attack data packets from MEC security controllers 150-1 and 150-2, or may compile information about all data packets targeting node 130-3 from MEC security controllers 150-1 and 150-2. Accordingly, MEC security controller 150-3 may have a complete set of data from which to determine if an attack has been initiated against node 130-3 and/or content, services, processing, and/or data hosted by node 130-3.

In some embodiments, MEC security controllers 150-1 and 150-2 may perform transactional analysis of received data packets and/or requested data, and MEC security controller 150-3 may perform a stateful analysis of the data packets targeting node 130-3 (e.g., data packets received at MEC security controllers 150-1 and 150-2). The transactional analysis may include inspecting each received data packet for various attack signatures and/or monitoring request rates for different content and/or request rates from different UEs 160. The stateful analysis may include monitoring request patterns, sequences of requests, and/or data packets of a transaction or session in order to identify attacks that may go undetected with the transactional analysis. In some embodiments, MEC security controller 150-3 may also monitor aggregate request rates for different content and/or from different UEs 160 in order to detect a distributed attack that originates from different network points of access 110 where the collective request rates may amount to an attack, but the request rates observed by each MEC security controller 150-1 and 150-2, upstream from MEC security controller 150-3, may not amount to an attack.

As shown in FIG. 4, each MEC security controller 150 may inspect (at 1) received data packets, and/or may initiate attack protections on itself, other MEC security controllers 150, or MEC devices 120 that are upstream towards the attack point of origin (e.g., a network point of access 110) in response to detecting an attack signature in one or more of the inspected (at 1) data packets. For instance, MEC security controller 150-3 may implement (at 2) a first set of attack protections in response to detecting an attack signature in data packets it received from UEs 160 operating in network points of access 110-1 and 110-2, and/or in response to detecting the attack signature from data packets that target content, services, processing, and/or data originating from node 130-3, and that were compiled from MEC security controllers 150-1 and 150-2. In response to detecting the attack signature, MEC security controller 150-3 may activate (at 2) the first set of attack protections on MEC devices 120-1 and 120-2 because MEC security controller 150-3 may receive or compile network traffic from UEs 160 operating in network points of access 110-1 and 110-2, and MEC devices 120-1 and 120-2 are in the network paths between network points of access 110-1 and 110-2 and MEC security controller 150-3.

MEC security controller 150-1 may implement (at 3) a second set of attack protections in response to detecting an attack signature in data packets it received from UEs 160 operating in network points of access 110-1. MEC security controller 150-1 may also activate (at 3) the second set of attack protections on MEC device 120-1 in the upstream network path connecting MEC security controller 150-1 to network point of access 110-1.

Similarly, MEC security controller 150-2 may implement (at 4) a third set of attack protections in response to detecting an attack signature in data packets it received from UEs 160 operating in network point of access 110-2. MEC security controller 150-2 may also activate (at 4) the third set of attack protections on MEC device 120-2 in the upstream network path connecting MEC security controller 150-2 to network point of access 110-2.

Figure 5:
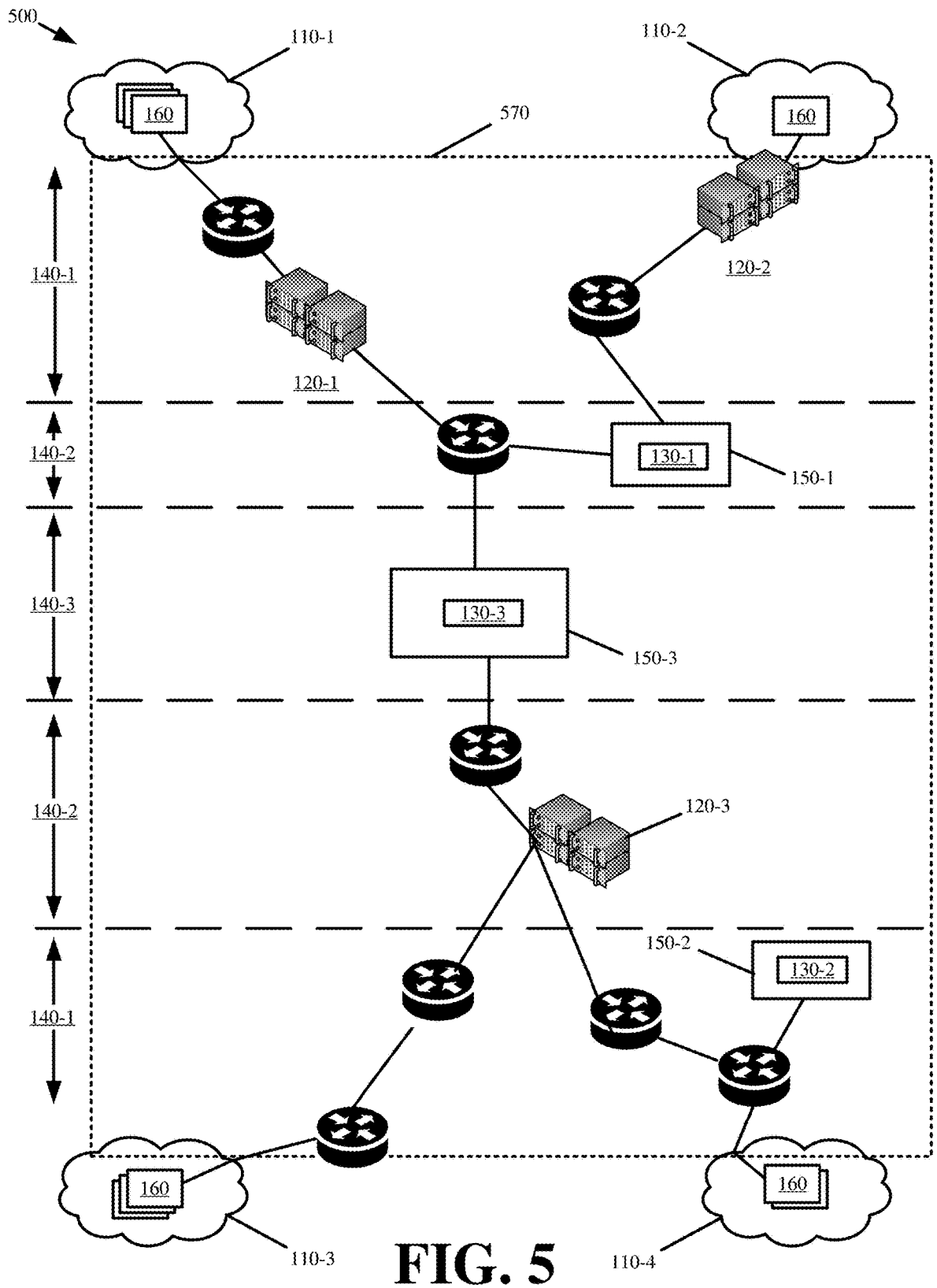
FIG. 5 illustrates an example environment in which one or more embodiments, described herein, may be implemented.

FIG. 5 illustrates an example environment 500 in which one or more embodiments, described herein, may be implemented. As shown in FIG. 5, environment 500 may include network points of access 110-1, 110-2, 110-3, and 110-4, MEC devices 120-1, 120-2, and 120-3, network nodes 130-1, 130-2, and 130-3, network tiers 140-1, 140-2, and 140-3, MEC security controllers 150-1, 150-2, and 150-3, UEs 160, and network 570. Environment 500 presents the illustrated devices, components, and/or networks with different orientation, arrangement, and/or placement in network 570 than in networks of prior figures. This alternative orientation, arrangement, and/or placement may not affect the operation of the devices, components, and/or networks if the connections between the devices, components, and/or networks is not affected.

The quantity of devices, components, and/or networks, illustrated in FIG. 5, is provided for explanatory purposes only. In practice, environment 500 may include additional devices, components, and/or networks; fewer devices, components, and/or networks; different devices, components, and/or networks; or differently arranged devices, components, and/or networks than illustrated in FIG. 5. For example, while not shown, environment 500 may include devices, systems, and/or other physical hardware that facilitate or enable communication between various devices and/or components shown in environment 500, such as routers, modems, gateways, switches, hubs, etc. Alternatively, or additionally, one or more of the devices of environment 500 may perform one or more functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500. For instance, each MEC security controller 150 may be integrated as part of a nearby node 130, or may run using resources of a corresponding node 130.

Environment 500 may correspond to a Fifth Generation ("5G") network, and/or may include elements of a 5G network. While discussed here in the context of a 5G network, in some embodiments, MEC security controllers 150 and/or MEC devices 120 may additionally, or alternatively, be implemented and/or executed by devices of other networks including, for example, a Fourth Generation ("4G") network, a Long-Term Evolution ("LTE") network, a Third Generation ("3G") network, a public land mobile network ("PLMN"), and/or another network.

Each network point of access 110 may correspond to a Radio Access Network ("RAN"), Personal Area Network ("PAN"), Local Area Network ("LAN"), Wide Area Network ("WAN"), WiFi network, and/or other network service region or location from which one or more UEs 160 may obtain wired or wireless network access. For instance, network point of access 110-1 may be, or may include, a 5G RAN that includes one or more base stations, via which UEs 160, that operate from network area 110-1, may communicate with one or more other elements of environment 500. As another example, network point of access 110-2 may correspond to a hub of an Internet Service Provider ("ISP") from which multiple subscribers gain access to an external network such as the Internet. Points of access 110 may be operated under control of a single network operator (e.g., a wireless telecommunications network operator), or may be operated under control of different network operators.

Each MEC device 120 may be located at or geographically proximate to a different network point of access 110. In some embodiments, a MEC device 120 may run using resources of a base station or other network equipment that generates one of network points of access 110. In some embodiments, a MEC device 120 may run on configurable server resources that are collocated or geographically proximate to network equipment that generates one of network points of access 110. For instance, a MEC device 120 may be located at an ISP hub. Preferably, MEC devices 120 are located in first network tier 140-1 so as to be some minimal number of network hops from a network point of access 110, or to enable low latency communication (e.g., less than 10 milliseconds of latency) with UEs 160 operating from a network point of access 110. However, as shown in FIG. 5, MEC device 120-3 may be located in network tier 140-2. Due to its network positioning, MEC device 120-3 may implement attack protections for UEs 160 that operate in multiple network points of access 110 (e.g., network points of access 110-3 and 110-4).

Each MEC device 120 may be a proxy device that receives traffic passing on a network path connecting the MEC device 120 to at least one network point of access 110. MEC devices 120 may selectively intercept upstream and/or downstream traffic, or may selectively allow the traffic to pass through. MEC devices 120 may intercept attack data packets and block the data packets from further entering network 570 when the attack data packets contain an attack signature matching an attack signature of an implemented attack protection. MEC devices 120 may also inspect the data packets on the network path, with or without intercepting the data packets, in order to determine if the data packets contain an attack signature for an implemented attack protection, and/or to determine if the data packets contain a security activation message. In some embodiments, MEC devices 120 may have a packet filter that extracts a subset of desired data packets from the network path for inspection. For instance, MEC devices 120 may be configured with a packet filter that identifies HTTP 3xx, 4xx, and/or 5xx messages that may be security activation messages, or that identifies potential attack data packets from suspected attacking UEs 160.

Nodes 130 may include servers, network hosts, and/or other devices that UEs 160 may request content, services, processing, and/or data from. Nodes 130 may be accessed via a network address or URL. As noted above, nodes 130 may be part of a single distributed network (e.g., a CDN), or may be independently operated.

MEC security controllers 150 are devices that may operate to protect nodes 130 from attack. In some embodiments, MEC security controllers 150 include firewall functionality to implement attack protections. In some embodiments, MEC security controllers 150 include logic for detecting different network attacks via attack signatures, request patterns, and/or other criteria, and for shifting attack protections upstream closer to network points of access 110 where the attacks originate.

In some embodiments, MEC security controllers 150 may run on the same set of resources as nodes 130. In some other embodiments, MEC security controllers 150 may be separate devices that are connected via a network interface to one or more nodes 130 under protection of the MEC security controllers 150.

MEC security controllers 150 may have a similar proxy function as MEC devices 120. For instance, MEC security controllers 150 may inspect data packets that are directed to a protected node 130 or another node 130 elsewhere in network 570. MEC security controllers 150 may also intercept, block, redirect, and/or otherwise manipulate data packets from an intended destination or from continuing through a particular network path. In some embodiments, a data packet with a network address that is used to access a particular node 130 may route to a MEC security controller 150 that protects that particular node 130 from network attack.

MEC security controllers 150 may operate independently of one another, or may interoperate. MEC security controller 150 interoperation may include different MEC security controllers 150 sharing information about different network attacks, attack signatures, and/or data packets. In this manner, MEC security controllers 150 may work together to identify distributed network attacks. A distributed network attack may be an attack in which the data packets routed to any particular MEC security controller 150 do not satisfy attack signatures of any attack, but the collective set of data packets routed to two or more MEC security controllers 150 may satisfy the attack signature of an attack.

UEs 160 may include computation and communication devices, such as wireless mobile communication devices, that may obtain network access and/or communicate from network points of access 110. For instance, a UE 160 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a desktop computer, a tablet computer; a camera; a personal gaming system; an Internet-of-Things ("IoT") device (e.g., a sensor, a smart home appliance, or the like); or another type of computation and communication device. UEs 160 may send traffic to and/or receive traffic from different nodes 130 in network 570 via network connectivity that is provided when operating in or from one or more network points of access 110.

UEs 160 may communicate in network points of access 110 via an air interface. For instance, network area 110-1 may include a base station that may receive traffic (e.g., voice call traffic, data traffic, messaging traffic, signaling traffic, etc.) from UEs 160 via the air interface, may communicate the traffic downstream where it can be inspected by MEC device 120-1 while en route to an intended destination. UEs 160 may also communicate via a wired interface (e.g., a broadband network connection).

Network 570 may represent a data network from which UEs 160 in network points of access 110 access different sites and/or content. Nodes 130 may represent different content sources that can be accessed by UEs 160. Network 570 may include one or more wired and/or wireless networks. For example, network 570 may include an IP-based packet data network, a WAN such as the Internet, a private enterprise network, and/or one or more other networks.

Figure 6:
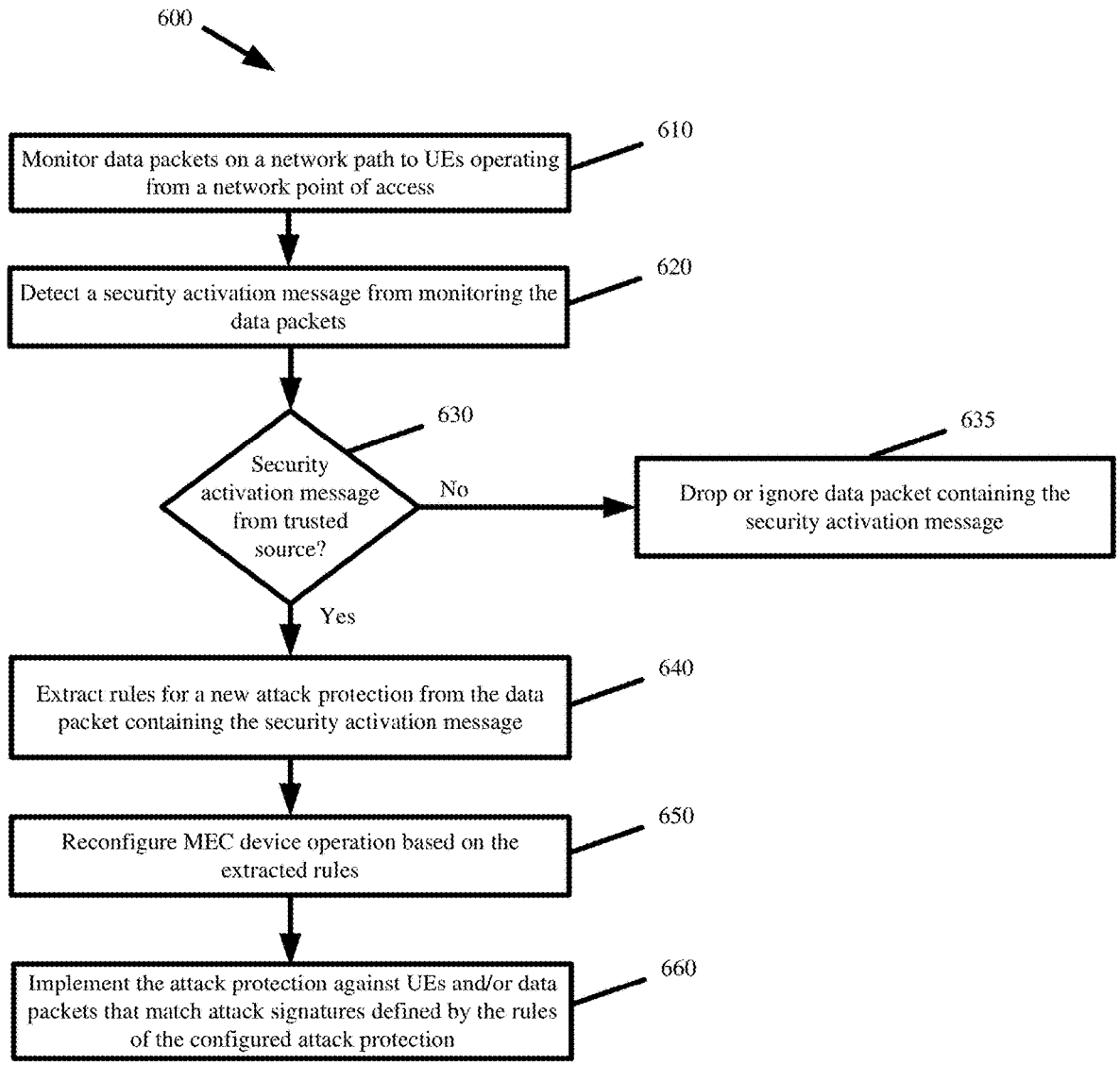
FIG. 6 presents a process for configuring a MEC device to implement an attack protection based on security activation messaging provided by a MEC security controller in accordance with some embodiments described herein.

FIG. 6 presents a process 600 for configuring a MEC device 120 to implement an attack protection based on security activation messaging provided by a MEC security controller 150 in accordance with some embodiments described herein. Process 600 may be performed by any MEC device 120 of network 570. Process 600 may also be part of other processes by which MEC device 120 is configured as a caching resource to accelerate content delivery, provide low-latency services, provide edge computing or processing, and/or other operations that are executed for UEs 160 operating from nearby network points of access 110. Process 600 may alternatively be performed by a MEC security controller 150 that receives a security activation message from another MEC security controller 150.

Process 600 may include monitoring (at 610) data packets passing on a network path in which MEC device 120 or MEC security controller 150 implementing process 600 is disposed. For instance, MEC device 120 may monitor the data packet headers in search of a header identifying a security activation message. The security activation message may be a data packet that includes the X-MECSecurity extended header field or other extended header field that is indicative of a security activation message. The security activation message may also be a message of a particular type or form (e.g., HTTP 3xx, 4xx, or 5xx message).

In response to detecting (at 620) a security activation message from the monitoring (at 610), process 600 may include verifying (at 630) that the security activation message originated from a trusted MEC security controller 150. To do so, MEC device 120 may obtain an encrypted signature that has been inserted in the security activation message, may decrypt the signature using a public key, and may verify the identity of the sender based on the decrypted result. MEC device 120 may verify the identity of the sender when the decrypted identifier is within a set of identifiers for trusted MEC security controllers 150. In some embodiments, MEC security controller 150 may establish a secure connection with MEC device 120, and may send the security activation message to MEC device 120 via the secure connection. In some such embodiments, MEC device 120 can trust that the security activation message originated from a trusted MEC security controller 150, and therefore may base the verification (at 630) on the endpoint of the secure connection. Directly sending the security activation messages from MEC security controller 150 to MEC devices 120 may also reduce the load on MEC devices 120, as MEC devices 120 can avoid monitoring (at 610) the data packets in order to detect and extract the security activation messaging from the data packets.

In response to verifying (at 630—No) that the security activation message did not originate from a trusted MEC security controller 150, process 600 may include dropping (at 635) the corresponding data packet because MEC device 120 determined that the security activation message was tampered with or originated from an untrusted source. Instead of dropping (at 635) the data packet, MEC device 120 may simply ignore (at 635) the data packet and/or forward the data packet to the intended recipient.

In response to verifying (at 630—Yes) that the security activation message originated from a trusted MEC security controller 150, process 600 may include extracting (at 640) rules for a new attack protection from the data packet. The rules may be inserted in the X-MEC Security extended header field as an enumerated list or may be inserted in the data packet payload. Process 600 may further include reconfiguring (at 650) operation of MEC device 120 to implement the attack protection according to the extracted rules.

Reconfiguring operation of MEC device 120 may include entering the rules into a security enforcement configuration of MEC device 120 where attack protections implemented by MEC device 120 are defined. In some embodiments, the rules provide identifiers that can be used to block certain UEs 160, and/or block certain data packets or requests. The rules may further specify one or more attack protections to implement from a set of attack protections supported by MEC device 120. For instance, a first rule may specify attack protections for blocking suspected attack data packets, and a second rule may specify attack protections that cause MEC device 120 to send a computational problem to the sending UE 160 in response to a suspected attack data packet, and forwarding the suspected attack data packet to the intended recipient upon receiving a correct solution to the computational problem. The rules may also set a duration for enforcing an attack protection. For instance, the rules may specify blocking all traffic from one or more suspected attacking UEs 160 for five minutes. The rules may set other conditions or parameters for the attack protections that are implemented by MEC devices 120.

In response to configuring (at 650) an attack protection at MEC device 120, process 600 may include implementing (at 660) the attack protection against UEs 160 and/or data packets that match the one or more attack signatures defined for the configured attack protection. Implementing the attack protection may include monitoring the data packets originating from UEs 160 in one or more network points of access 110, and taking protective action against those data packets with headers and/or payloads that match one or more of the attack signatures. An attack signature can be any combination of header and/or payload properties. A simple attack signature may include a blacklisted IP address or blacklisted identifier combination (e.g., address, port, and user agent). A more complicated attack signature may be one or more header properties or payloads of different data packets that are constant, or that are randomized with irregular values. For instance, an attacking UE 160 may change the source addressing for different attack data packets, but may reuse the same TCP sequence number and/or window size for each data packet. Alternatively, an attacking UE 160 may randomize the TCP sequence and/or window size for each data packet, but the selected values may be outside expected values.

In some embodiments, MEC device 120 or MEC security controller 150 may deactivate and/or remove attack protections that have expired (e.g., exceeded the configured amount of time). This frees resources of MEC device 120 or MEC security controller 150 for other tasks. For instance, the resources of MEC device 120 may be reconfigured for other MEC uses including accelerating content delivery to the network edge, providing low-latency services, providing edge computing, etc.

The shifting network security provided by MEC security controller 150 and MEC devices 120 is also effective in protecting against spoofed attack traffic. Spoofed attack traffic may include attack data packets that are sent by one or more UEs 160, but with spoofed (e.g., changed) source addressing that makes it seem like the attack data packets are being sent from a much larger or different set of UEs 160.

An attack that uses spoofed attack data packets may be difficult to detect and/or combat because of the changing addressing. The changing addressing makes it difficult to differentiate between which UE 160 is responsible for sending attack data packets, and which UE 160 is responsible for sending valid data packets. The changing addressing makes it difficult to identify any particular UE 160 sending an abnormal rate of packets. The changing addressing also makes it difficult to combat or block subsequent data packets.

Figure 7:
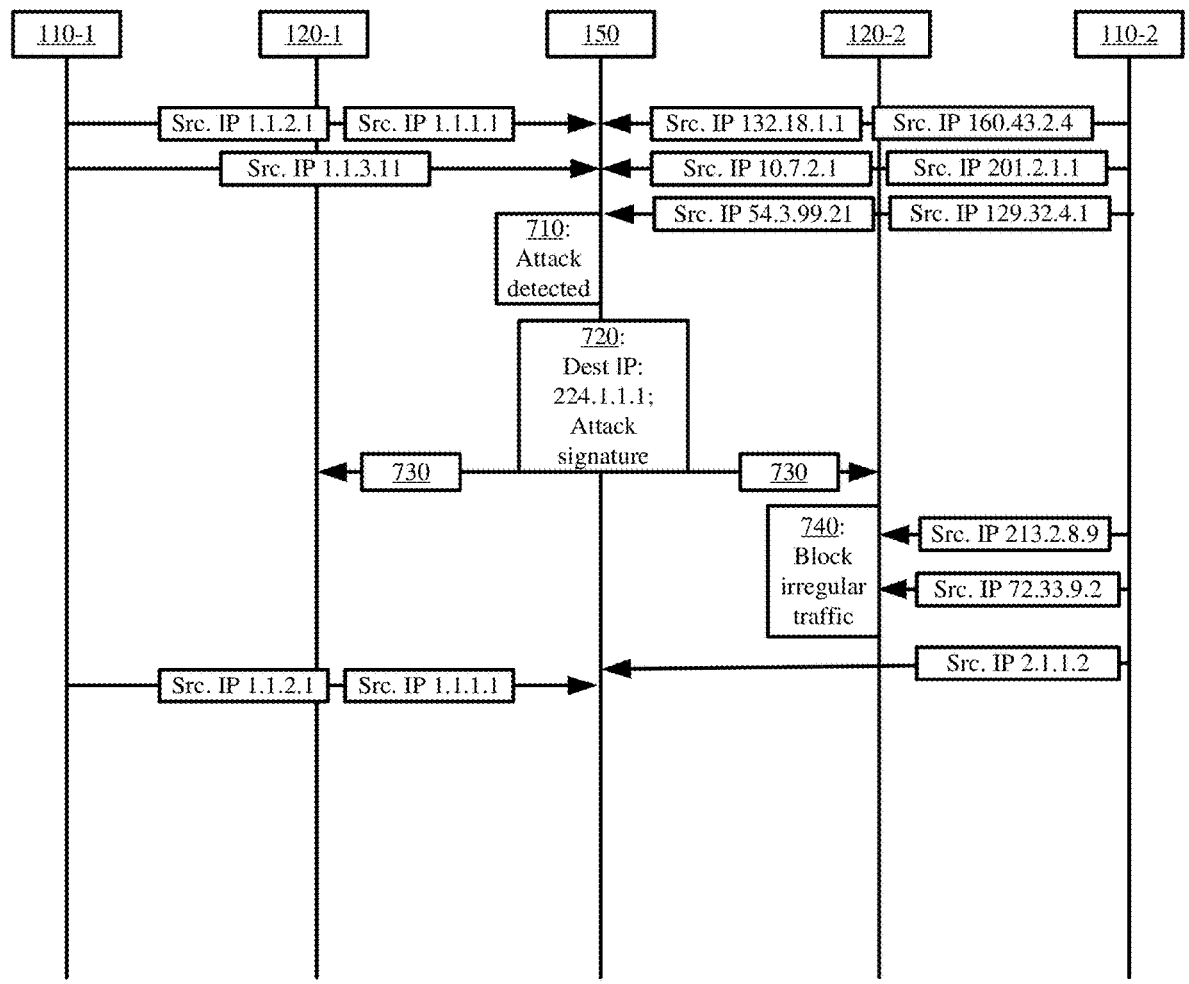
FIG. 7 illustrates an example of shifting network security to an attack point of origin where spoofed attack data packets originate in accordance with some embodiments described herein.

The shifting network security provided MEC security controller 150 and MEC devices 120 can stop the attack traffic at the attack point of origin such that the changing addressing becomes irrelevant. FIG. 7 illustrates an example of shifting network security to an attack point of origin where spoofed attack data packets originate in accordance with some embodiments described herein.

FIG. 7 illustrates MEC security controller 150 receiving data packets from UEs 160 operating from network point of access 110-1 via a first network path, and MEC security controller 150 receiving data packets from UEs 160 operating from network point of access 110-2 via a second network path. Based on the received data packets, MEC security controller 150 may detect (at 710) an attack that uses spoofed attack data packets.

MEC security controller 150 may detect (at 710) the attack, despite the spoofed addressing of the attack data packets, by one or more of monitoring a high rate of requests targeting specific content or a specific node, a high volume of initial requests from different IP addresses that do not result in a continued transaction (e.g., connection requests that are never completed, requests for initial data packets of content without subsequent data packets being requested, etc.), requests from irregular addresses (e.g., addresses that previously or normally do not access specific content or a specific node), and/or other attack signatures (e.g., changing addressing with other constant header parameters, changing addressing with irregularly randomized other header parameters, etc.).

MEC security controller 150 may be unable to send a security activation message back to a spoofed address to initiate attack protections, because the security activation message may be routed to an actual network endpoint of the spoofed address rather than an attacking UE 160 that submitted the attack data packet with the spoofed address. If routed to the actual network endpoint, and not the attacking UE 160, then any attack protections implemented by MEC devices 120 in the network path to the actual network endpoint would be of no consequence and would not combat further attack traffic from the attacking UE 160 using the spoofed addressing.

Accordingly, MEC security controller 150 may send (at 720) the security activation message to a particular multicast address or broadcast address that MEC devices 120 use to obtain (at 730) messaging from one or more MEC security controllers 150. MEC security controller 150 may populate the security activation message with one or more suspected spoofed network addresses. MEC security controller 150 may, additionally or alternatively, populate the security activation message with an encrypted signature, and/or attack protection parameters.

MEC devices 120 may receive (at 730) the security activation message, and may compare the suspected spoofed network addresses in the message against addressing in data packets that originated from a network point of access 110 monitored by that MEC device 120. If an irregular number of suspected spoofed network addresses (e.g., a threshold number of addresses) originate from a network point of access 110, then MEC device 120 may implement (at 740) attack protections for data packets originating from that point of access 110. For instance, in FIG. 7, MEC device 120-2 may determine that the spoofed addressing, detected by MEC security controller 150 and identified in the security activation message, originates from network point of access 110-2, and may therefore implement (at 740) the attack protections specified in the security activation message.

In some embodiments, the security activation message may omit the spoofed addressing. In some such embodiments, MEC devices 120 may implement (at 740) the attack protections specified in the security activation message based on whether data packets originating from a monitored network point of access 110 contain irregular addressing and/or whether the rate of data packets that are being issued from that network point of access 110 and that target a particular node are irregular. For instance, since MEC device 120-1 monitors data packets originating from network point of access 110-1, it is expected that UEs 160 operating from network point of access 110-1 would have addressing that falls within a common first subnet, would have addressing associated with a first geographic region covered by network point of access 110-1, or would have some first set of IP addresses associated with that network point of access 110-1. Similarly, since MEC device 120-2 monitors data packets originating from network point of access 110-2, it is expected that UEs 160 operating from network point of access 110-2 would have different addressing than UEs 160 operating from network point of access 110-1, but still have addressing that falls within a second subnet, would have second addressing associated with a second geographic region covered by network point of access 110-2, or would have some second set of IP addresses associated with that network point of access 110-2. For instance, data packets originating from UEs 160 operating in a network point of access 110 in Los Angeles, Calif. may be expected to include IP addressing in the range of 142.129.x.x. If data packets originating from that network point of access 110 had other IP addressing (e.g., 142.126.x.x typically associated with UEs 160 in Toronto, Canada, or 122.111.3.12 typically associated with UEs 160 in Melbourne, Australia), then MEC device 120 may implement attack protections in response to security activation messaging received via the multicast group or broadcast address used by MEC security controller 150.

In FIG. 7, MEC device 120-1 may determine that the data packets originating from network point of access 110-1 include expected addressing for the geographic region associated with network point of access 110-1, and/or that the rate of data packets targeting any specific content or node does not exceed a threshold. Accordingly, MEC device 120-1 does not implement the attack protections specified in the security activation message sent (at 720) by MEC security controller 150.

Conversely, MEC device 120-2 may determine that the data packets originating from network point of access 110-2 include irregular or previously unseen addressing for the geographic region associated with network point of access 110-2, and/or that the rate of data packets targeting any specific content or node exceeds a threshold. In some embodiments, MEC device 120 may condition the implementation of the attack protections based on the irregular addressing originating out of network point of access 110-1, and/or the data packets having other matching properties (e.g., targeting a specific URL, having other fixed header parameters, having other irregular randomized header parameters, etc.).

In some embodiments, MEC devices 120 may implement (at 740) the attack protections specified in the security activation message based on one or more other parameters that form an attack signature of the spoofed attack, and that can be used to detect subsequent data packets of the same spoofed attack. For instance, the attack signature may identify one or more header parameters that remain constant or that have irregular values in the spoofed attack data packets. The attack signature may also identify a constant payload of the spoofed attack data packets.

In response to implementing (at 740) the attack protections, MEC device 120-2 may block data packets that match the attack signature specified in the security activation message. For instance, MEC device 120-2 may block data packets originating from network point of access 110-2 that have irregular addressing (e.g., addressing that is not associated with the geographic region of network point of access 110-2 or addressing that was previously not issued from network point of access 110-2). The attack signature may also configure MEC device 120-2 to block data packets that match other attack criteria specified as an attack signature in the security activation message (e.g., target a specific URL, have certain fixed header parameters, have certain irregular randomized header parameters, etc.). Accordingly, the attack signature can be used to better differentiate the attack data packets from the valid data packets. For instance, the attack data packets may have spoofed addressing that does not appear to be irregular, but may have a repeating TCP sequence number or window size, may have a repeating payload, or may have entirely randomized and irregular values for those and/or other header parameters.

Figure 8:
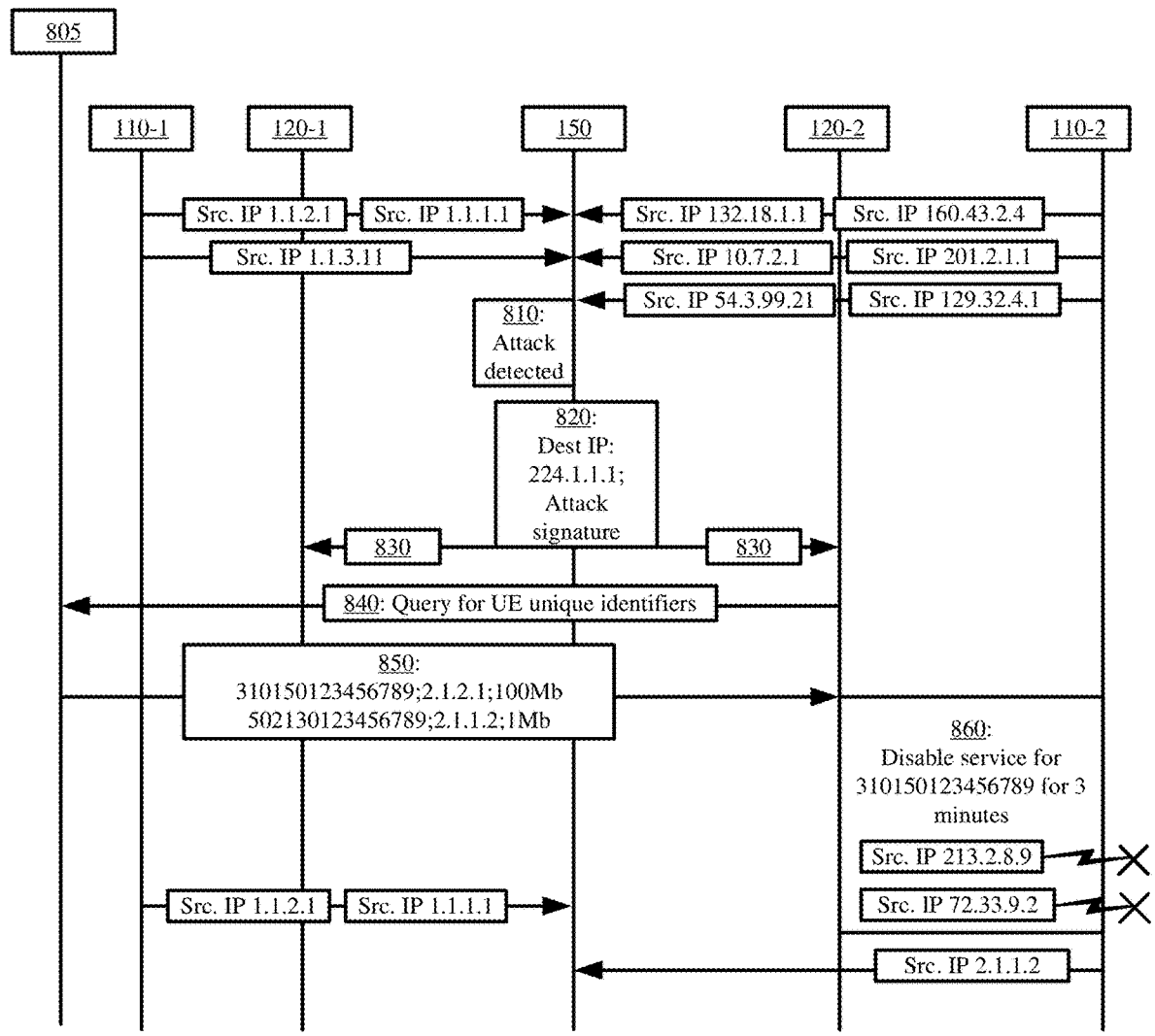
FIG. 8 illustrates an example of MEC devices implementing attack protections against spoofed attack traffic based on unique UE identifiers in accordance with some embodiments.

In some embodiments, MEC security controller 150 and/or MEC devices 120 may use other network resources to implement the shifting attack protections against spoofed attack traffic at the network edge. FIG. 8 illustrates an example of MEC devices 120 implementing attack protections against spoofed attack traffic based on unique UE identifiers in accordance with some embodiments.

FIG. 8 includes network subscription server 805. Network subscription server 805 may store registration information about UEs 160 that gain network access via one or more network points of access 110. Network subscription server 805 may include one or more of Home Subscriber Server ("HSS"), Home Location Register ("HLR"), Access and Mobility Management function ("AMF"), Session Management function ("SMF"), Policy Control Function ("PCF"), Authentication Server Function ("AUSF"), Unified Data Management ("UDM"), and/or other devices of a wireless telecommunications network or ISP.

As in FIG. 7, MEC security controller 150 in FIG. 8 may detect (at 810) an attack that uses spoofed attack data packets based on a high rate of requests targeting specific content, a high volume of initial requests from different IP addresses that do not result in a continued transaction, and/or other attack signatures. MEC security controller 150 may send (at 820) a security activation message to the particular multicast address or broadcast address that MEC devices 120 use to obtain (at 830) messaging from one or more MEC security controllers 150.

MEC device 120-1 may determine that there is no irregular addressing for data packets originating from network point of access 110-1, that the request patterns are not irregular, that the rate of requests targeting specific content or a specific node are not irregular, and/or that the data packets do not match other parameters of the attack signature. Accordingly, MEC device 120-1 may not implement the attack protections.

However, MEC device 120-2 may determine that the data packets originating out of network point of access 110-2 match the attack signature, and may implement the attack protections. To implement the attack protections in FIG. 8, MEC device 120-2 may query (at 850) network subscription server 805.

The query may include an identifier for network point of access 110-2 that is monitored by MEC device 120-2. In some embodiments, MEC device 120-2 may query (at 850) network subscription server 805 for a unique identifier that identifies each UE 160 operating from network point of access 110-1. The unique identifier may be different than the IP addressing assigned to each UE 160, and may include unique identifiers provided by a UE 160 when registering for network access. For instance, the unique identifier may include unique values from the Subscriber Identification Module ("SIM") of a UE 160 (e.g., International Mobile Subscriber Identity ("IMSI") or International Mobile Equipment Identity ("IMEI")), Cell Radio Network Temporary Identifier ("C-RNTI"), Globally Unique Temporary Identifier ("GUTI"), Home Network Identity ("HNI"), Media Access Control ("MAC") address, or other unique UE identifying values.

In response to the query (at 850), MEC device 120-2 may receive the unique identifiers of UEs 160 operating from network point of access 110-2. Network subscription server 805 may also provide MEC device 120-2 with IP addressing that was assigned to each connected UE 160 and/or network usage by each UE 160.

Based on the assigned addressing and network usage information, MEC device 120-2 can determine which UEs 160 operating from network point of access 110-2 are spoofing their network addressing. For instance, the network usage information from network subscription server 805 may identify a particular UE 160 that is assigned a first address and that produces a large amount of traffic. MEC device 120-2 may monitor traffic originating from network point of access 110-2, may detect the large amount of traffic, but may determine, from inspecting the traffic, that few or none of the data packets include the first address and/or those data packets may also match the attack signature specified in the security activation message. Accordingly, MEC device 120-2 may determine that the particular UE 160 is generating the spoofed attack traffic, and may implement (at 860) attack protections against that particular UE 160.

MEC device 120-2 may implement (at 860) protective actions based on the unique identifier of the particular UE 160 to prevent further submission of spoofed data packets by the particular UE 160. For instance, MEC device 120-2 may temporarily disable service, throttle bandwidth, and/or drop packets submitted by the particular UE 160 using the unique identifier. In some embodiments, MEC device 120-2 may send messaging to the base station or RAN of network point of access 110-2. The messaging may include the unique identifier of the particular UE 160, and the base station or RAN may temporarily disable service for the particular UE 160 in response to the messaging. In some embodiments, MEC device 120-2 may signal the base station or RAN to disable a particular bearer, channel, or frequency used by the particular UE 160 identified via the unique identifier.

Figure 9:
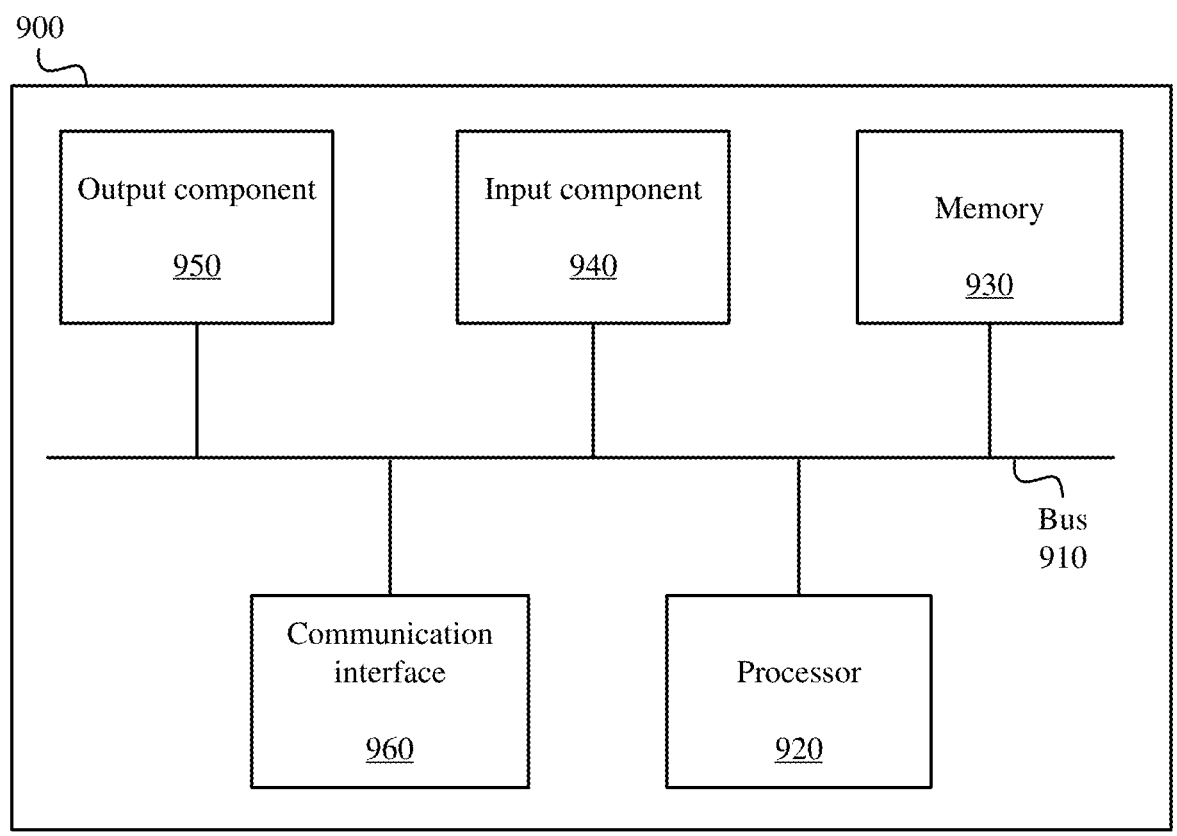
FIG. 9 illustrates example components of one or more devices, according to one or more embodiments described herein.

FIG. 9 is a diagram of example components of device 900. Device 900 may be used to implement one or more of the devices or systems described above (e.g., MEC security controller 150, MEC devices 120, nodes 130, UEs 160, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For instance, the devices may be arranged according to different peer-to-peer, private, permissioned, and/or other blockchain networks.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to FIGS. 1-7, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. For instance, MEC security controller 150 may execute from a shared device that also performs various services and/or functionalities for a service provider. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as t herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the ten "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context n which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a plurality of data packets via a first network path that connects to a first network point of access, and via a second network path that connects to a different second network point of access;
   detecting that a first set of the plurality of data packets originating from the first network point of access do not satisfy an attack signature, and that a second set of the plurality of data packets originating from the second network point of access satisfy the attack signature based on the second set of data packets comprising irregular addressing or irregular request patterns;
   retrieving an Internet Protocol ("IP") address that is assigned to each user equipment ("UE") of a set of UEs accessing a network via the second network point of access, and a network usage by each UE of the set of UEs;
   determining a mismatch between the network usage by a particular UE of the set of UEs and a computed usage from a subset of the second set of data packets comprising the IP address that is assigned to the particular UE, wherein the network usage by the particular UE comprises an amount of bandwidth or network capacity utilized by the particular UE at the second network point of access, wherein the computed usage comprises an amount of bandwidth or network capacity utilized by the subset of the second set of data packets comprising the IP address that is assigned to the particular UE, and wherein determining the mismatch comprises determining that the amount of bandwidth or network capacity utilized by the particular UE at the second network point of access is greater than the amount of bandwidth or network capacity utilized by the subset of the second set of data packets; and
   implementing attack protections against the particular UE by disabling network access, throttling network access, or blocking one or more data packets originating from the particular UE at the second network point of access using a unique identifier of the particular UE that is different than the IP address that is assigned to the particular UE.

2. The method of claim 1 further comprising:
   registering the particular UE for access to the network based on the unique identifier of the particular UE; and
   assigning the IP address to the particular UE in response to successfully registering the particular UE.

3. The method of claim 2, wherein the unique identifier comprises one or more of:
   an International Mobile Subscriber Identity ("IMSI"),
   an International Mobile Equipment Identity ("IMEI"),
   a Cell Radio Network Temporary Identifier ("C-RNTI"),
   a Globally Unique Temporary Identifier ("GUTI"),
   a Home Network Identity ("HNI"), or
   a Media Access Control ("MAC") address.

4. The method of claim 1 further comprising:
   detecting that the particular UE is using one or more spoofed addresses based on the mismatch between the network usage by the particular UE and the computed usage.

5. The method of claim 4, wherein implementing the attack protections comprises:
   preventing data packets comprising the one or more spoofed addresses from passing beyond the second network point of access.

6. The method of claim 1 further comprising:
   querying a network device using an identifier of the second network point of access; and
   receiving the unique identifier of the particular UE and the IP address that is assigned to the particular UE in response to querying the network device using the identifier of the second network point of access.

7. The method of claim 6,
   wherein the unique identifier of the particular UE comprises an identifier with which the particular UE registers for service with the network.

8. The method of claim 1 further comprising:
   querying a network device using an identifier of the second network point of access; and
   receiving the network usage by the particular UE at the second network point of access in response to querying the network device using the identifier of the second network point of access.

9. The method of claim 1, wherein implementing the attack protections comprises:
   preventing data packets comprising IP addresses that differ from the IP addresses that are assigned to the set of UEs from passing through the second network point of access.

10. A system comprising:
    a first network point of access;
    a second network point of access; and
    one or more devices configured to:
       receive a plurality of data packets via a first network path that connects to the first network point of access, and via a second network path that connects to the second network point of access;

detect that a first set of the plurality of data packets originating from the first network point of access do not satisfy an attack signature, and that a second set of the plurality of data packets originating from the second network point of access satisfy the attack signature based on the second set of data packets comprising irregular addressing or irregular request patterns;

retrieve an Internet Protocol ("IP") address that is assigned to each user equipment ("UE") of a set of UEs accessing a network via the second network point of access, and a network usage by each UE of the set of UEs;

determine a mismatch between the network usage by a particular UE of the set of UEs and a computed usage from a subset of the second set of data packets comprising the IP address that is assigned to the particular UE, wherein the network usage by the particular UE comprises an amount of bandwidth or network capacity utilized by the particular UE at the second network point of access, wherein the computed usage comprises an amount of bandwidth or network capacity utilized by the subset of the second set of data packets comprising the IP address that is assigned to the particular UE, and wherein determining the mismatch comprises determining that the amount of bandwidth or network capacity utilized by the particular UE at the second network point of access is greater than the amount of bandwidth or network capacity utilized by the subset of the second set of data packets; and implement attack protections against the particular UE by disabling network access, throttling network access, or blocking one or more data packets originating from the particular UE at the second network point of access using a unique identifier of the particular UE that is different than the IP address that is assigned to the particular UE.

11. The system of claim 10, wherein the one or more devices are further configured to:
register the particular UE for access to the network based on the unique identifier of the particular UE; and
assign the IP address to the particular UE in response to successfully registering the particular UE.

12. The system of claim 10, wherein the one or more devices are further configured to:
detect that the particular UE is using one or more spoofed addresses based on the mismatch between the network usage by the particular UE and the computed usage.

13. The system of claim 12, wherein implementing the attack protections comprises:
preventing data packets comprising the one or more spoofed addresses from passing beyond the second network point of access.

14. The system of claim 10, wherein the one or more devices are further configured to:
query a network device using an identifier of the second network point of access; and
receive the unique identifier of the particular UE and the IP address that is assigned to the particular UE in response to querying the network device using the identifier of the second network point of access.

15. The system of claim 10, wherein the one or more devices are further configured to:
query a network device using an identifier of the second network point of access; and
receive the network usage by the particular UE at the second network point of access in response to querying the network device using the identifier of the second network point of access.

16. The system of claim 10, wherein implementing the attack protections comprises:
preventing data packets comprising IP addresses that differ from the IP addresses that are assigned to the set of UEs from passing through the second network point of access.

17. A non-transitory computer-readable medium, storing a set of processor-executable instructions, which, when executed by one or more processors, cause the one or more processors to:
receive a plurality of data packets via a first network path that connects to a first network point of access, and via a second network path that connects to a different second network point of access;

detect that a first set of the plurality of data packets originating from the first network point of access do not satisfy an attack signature, and that a second set of the plurality of data packets originating from the second network point of access satisfy the attack signature based on the second set of data packets comprising irregular addressing or irregular request patterns;

retrieve an Internet Protocol ("IP") address that is assigned to each user equipment ("UE") of a set of UEs accessing a network via the second network point of access, and a network usage by each UE of the set of UEs;

determine a mismatch between the network usage by a particular UE of the set of UEs and computed usage from a subset of the second set of data packets comprising the IP address that is assigned to the particular UE, wherein the network usage by the particular UE comprises an amount of bandwidth or network capacity utilized by the particular UE at the second network point of access, wherein the computed usage comprises an amount of bandwidth or network capacity utilized by the subset of the second set of data packets comprising the IP address that is assigned to the particular UE, and wherein determining the mismatch comprises determining that the amount of bandwidth or network capacity utilized by the particular UE at the second network point of access is greater than the amount of bandwidth or network capacity utilized by the subset of the second set of data packets; and implement attack protections against the particular UE by disabling network access, throttling network access, or blocking one or more data packets originating from the particular UE at the second network point of access using a unique identifier of the particular UE that is different than the IP address that is assigned to the particular UE.

18. The non-transitory computer-readable medium of claim 17, wherein the processor-executable instructions further include processor-executable instructions to:
detect that the particular UE is using one or more spoofed addresses based on the mismatch between the network usage by the particular UE and the computed usage.

19. The non-transitory computer-readable medium of claim 17, wherein the processor-executable instructions to implement the attack protections comprises:
processor-executable instructions to prevent data packets comprising the one or more spoofed addresses from passing beyond the second network point of access.

20. The non-transitory computer-readable medium of claim 17, wherein the processor-executable instructions further include processor-executable instructions to:
 register the particular UE for access to the network based on the unique identifier of the particular UE; and
 assign the IP address to the particular UE in response to successfully registering the particular UE.

\* \* \* \* \*